United States Patent
Hsieh et al.

(10) Patent No.: US 8,248,522 B2
(45) Date of Patent: Aug. 21, 2012

(54) DIGITAL CAMERA

(75) Inventors: Ming-Chih Hsieh, Taipei Hsien (TW); Tsung-Hsi Li, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 113 days.

(21) Appl. No.: 12/830,533

(22) Filed: Jul. 6, 2010

(65) Prior Publication Data

US 2011/0242409 A1    Oct. 6, 2011

(30) Foreign Application Priority Data

Mar. 30, 2010  (TW) ................. 99109744 A

(51) Int. Cl.
*H04N 5/225* (2006.01)
*G02B 13/16* (2006.01)
(52) U.S. Cl. ............... 348/373; 348/335; 396/347
(58) Field of Classification Search .......... 348/373–374, 348/335–360
See application file for complete search history.

(56) References Cited

U.S. PATENT DOCUMENTS

| | | | |
|---|---|---|---|
| 5,012,264 A * | 4/1991 | Nagano et al. | 396/301 |
| 6,845,218 B2 * | 1/2005 | Miyasaka et al. | 396/301 |
| 7,567,290 B2 * | 7/2009 | Tokiwa et al. | 348/360 |
| 7,801,439 B2 * | 9/2010 | Nagata et al. | 396/301 |
| 2011/0227535 A1 * | 9/2011 | Caskey et al. | 320/111 |

OTHER PUBLICATIONS

Figure 1 from Nagano: "Coupling device and power device for supplying electrical power as the coupling is established" Apr. 1991 (US-5,012,264).*
Figure 1A from Nagano: "Coupling device and power device for supplying electrical power as the coupling is established" Apr. 1991 (US-5,012,264).*

* cited by examiner

*Primary Examiner* — Hung Lam
(74) *Attorney, Agent, or Firm* — Altis Law Group, Inc.

(57) ABSTRACT

A digital camera includes a bezel and an extending ring. The bezel defines a circular-shaped recess, and N pairs of support arms are positioned on the inner sidewall of the recess. The N is an integer equaling or exceeding 2. Each of the pairs of support arms has different height and the two support arms in each of the pairs of support arms are symmetrically placed with respect to a central axis of the recess. The extending ring defines N−1 pairs of bar-shaped slots. An end of the extending ring contacts an end surface of one of the N pairs of support arms, and the N−1 pairs of bar-shaped slots are positioned corresponding to the other N−1 of the N pairs of support arms.

11 Claims, 5 Drawing Sheets

DIGITAL CAMERA

BACKGROUND

1. Technical Field

The present disclosure relates to digital cameras and, particularly, to a digital camera having an extending ring.

2. Description of Related Art

While portable electronic devices with camera function have become extremely popular, lack of a focusing function in many limits their ability to fully perform as a functional camera. An image sensor of the digital camera device may be a CCD image sensor or a CMOS image sensor, and thickness of the CCD image sensor often exceeds the thickness of the CMOS image sensor. However, as thicknesses of the image sensors vary, different bezels of the digital camera are required for mating a back focal length of a digital camera with the lens. The requirement for varied bezels makes the manufacturing process unduly cumbersome.

Therefore, a new digital camera is desired to overcome the limitations described.

BRIEF DESCRIPTION OF THE DRAWINGS

Many aspects of the present device can be better understood with reference to the following drawings. The components in the drawings are not necessarily drawn to scale, the emphasis instead being placed upon clearly illustrating the principles of the present digital camera. Moreover, in the drawings, like reference numerals designate corresponding parts throughout the several views.

DETAILED DESCRIPTION

Figure 1:
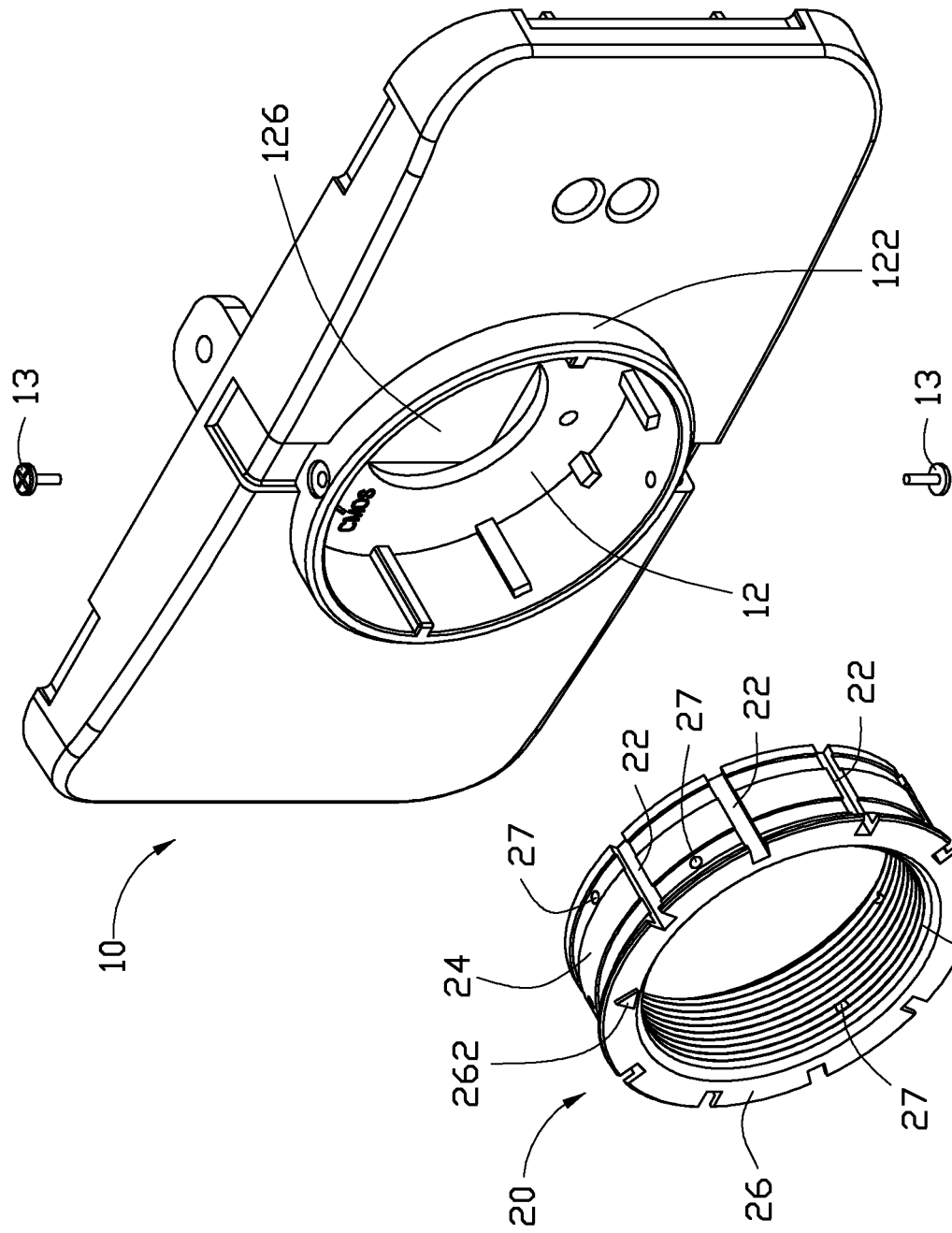
FIG. 1 is an exploded, isometric view of a digital camera according to an exemplary embodiment, the digital camera including a bezel.
Figure 2:
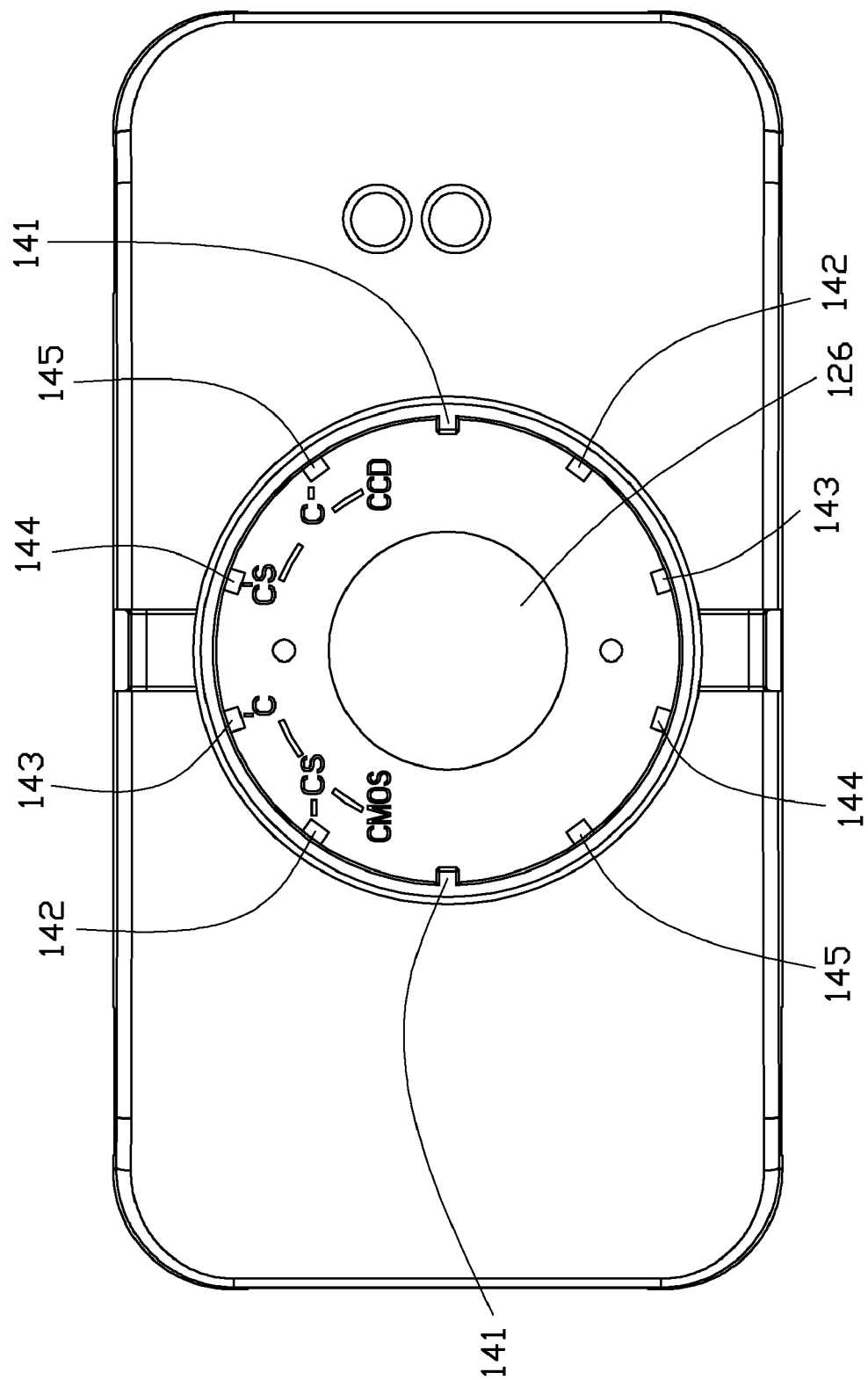
FIG. 2 is a front view of the bezel.
Figure 3:
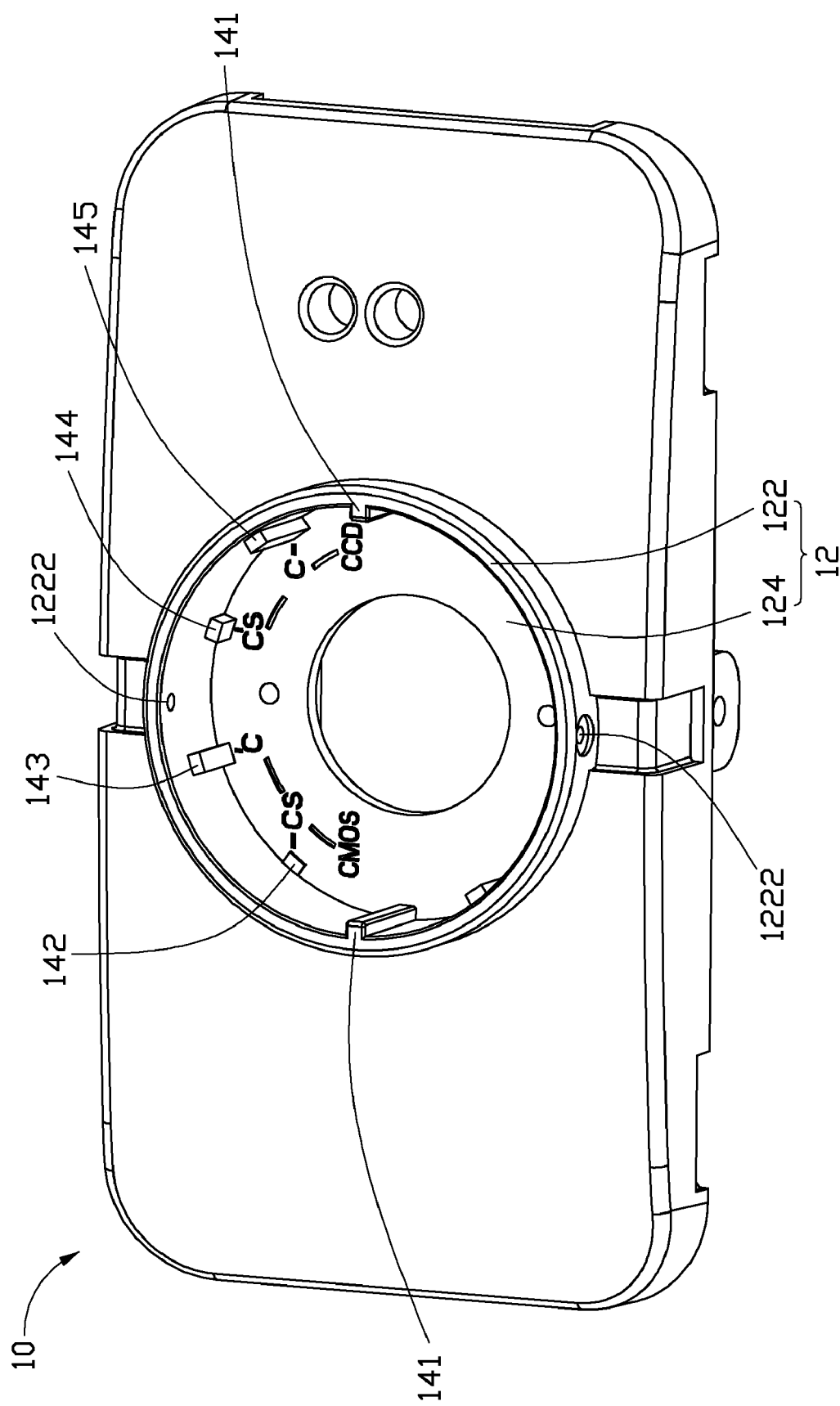
FIG. 3 is an isometric view of the bezel of FIG. 2.

Referring to FIGS. 1-3, a digital camera, according to an exemplary embodiment, is shown. The digital camera includes a bezel 10 and an extending ring 20. Other technical components well known in the fields related to the invention are not described in detail.

The bezel 10 defines a circular-shaped recess 12. An annular wall 122 perpendicularly extends outwards from a bottom wall 124 of the recess 12. An inner sidewall of the recess 12 includes N pairs of support arms. The N is an integer exceeding or equaling 2. In this embodiment, the N is 5, the inner sidewall of the recess 12 includes a first pair of support arms 141, a second pair of support arms 142, a third pair of support arms 143, a fourth pair of support arms 144, and a fifth pair of support arms 145. The pairs of support arms 141-145 are uniformly arrayed on the inner sidewall of the recess 12. The two support arms in each of the pairs of support arms 141-145 are symmetrically placed with respect to a central axis of the recess 12. A pair of through holes 1222 is defined in the annular wall 122 and between the third support arms 143 and the fourth support arms 144. The through holes 1222 are symmetrically placed with respect to the central axis of the recess 12. Each of the support arms 141-145 is bar-shaped and perpendicular to the bottom wall 124 of the recess 12. The width of each of support arms 141-145 is equal. The height of the first pair of support arms 141 exceeds the height of the second pair of support arms 142, the third pair of support arms 143, the fourth pair of support arms 144, and the fifth pair of support arms 145. The height of the first pair of support arms 141 equals the depth of the recess 12. The height of the second pair of support arms 142 is less than the height of the first pair of support arms 141, the third pair of support arms 143, the fourth pair of support arms 144, and the fifth pair of support arms 145. In other embodiments the height of the second pair of support arms 142 equal zero. In other words, no support arms on the second pair of support arms' 142 positions. The height of the third pair of support arms 143 exceeds the height of the second pair of support arms 142. A difference in heights between the third pair of support arms 143 and the second pair of support arms 142 is about 5 mm. The height of the fourth pair of support arms 144 exceeds the height of the second pair of support arms 142. A difference in heights between the fourth pair of support arms 144 and the second pair of support arms 142 equals a difference in thicknesses between a CCD image sensor and a CMOS image sensor. A difference in thicknesses between the CCD image sensor and the CMOS image sensor is about 2 mm. A difference in heights between the fifth pair of support arms 145 and the third pair of support arms 143 equals a difference in thicknesses between the CCD image sensor and the CMOS image sensor. The height of the fifth pair of support arms 145 exceeds the height of the fourth pair of support arms 144. A difference in heights between the fifth pair of support arms 145 and the fourth pair of support arms 144 is about 5 mm. Symbols "CS", "C", "CS", and "C" are defined on the bottom wall 124 of the recess 12 and near the support arms 142-145. A symbol "CMOS" is defined on the bottom wall 124 and near the second support arm 142. A symbol "CCD" is defined on the bottom wall 124 and near the fifth support arm 145. A through hole 126 is defined in the center portion of the bottom wall 124. It should be understood that the shape of the through hole 126 is not limited to a round hole. A square hole or other shapes are equally applicable, as long as the light beams emitted from the light source enter an image sensor (not shown).

The outer diameter of the extending ring 20 is less than the inner diameter of the recess 12. An inner sidewall of the extending ring 20 defines a threaded hole 28 for receiving a lens (not shown) therein. An outer sidewall of the extending ring 20 defines four pairs of bar-shaped slots 22. The width of each of the bar-shaped slots 22 exceeds the width of each of the support arms 141-145. A flange 26 extends outward from an inner sidewall of the extending ring 20, forming an annular ring. The flange 26 is perpendicular to the bar-shaped slots 22. A symbol "▲" 262 is defined on the flange 26. The extending ring 20 has a symbol portion 24. The symbol "▲" 262 is adjacent to and positioned toward the symbol portion 24. The bar-shaped slots 22 are positioned corresponding to the support arms 141-145. Each pair of bar-shaped slots 22 are symmetrically placed with respect to a central axis of the extending ring 20. A plurality of pairs of threaded holes 27 is defined in the extending ring 20. Each pair of threaded holes 27 is positioned opposite to each other. The bezel 10 and the extending ring 20 can be secured to each other by fasteners 13 each passing through one through hole 1222 and engaging with one threaded hole 27.

Figure 4:
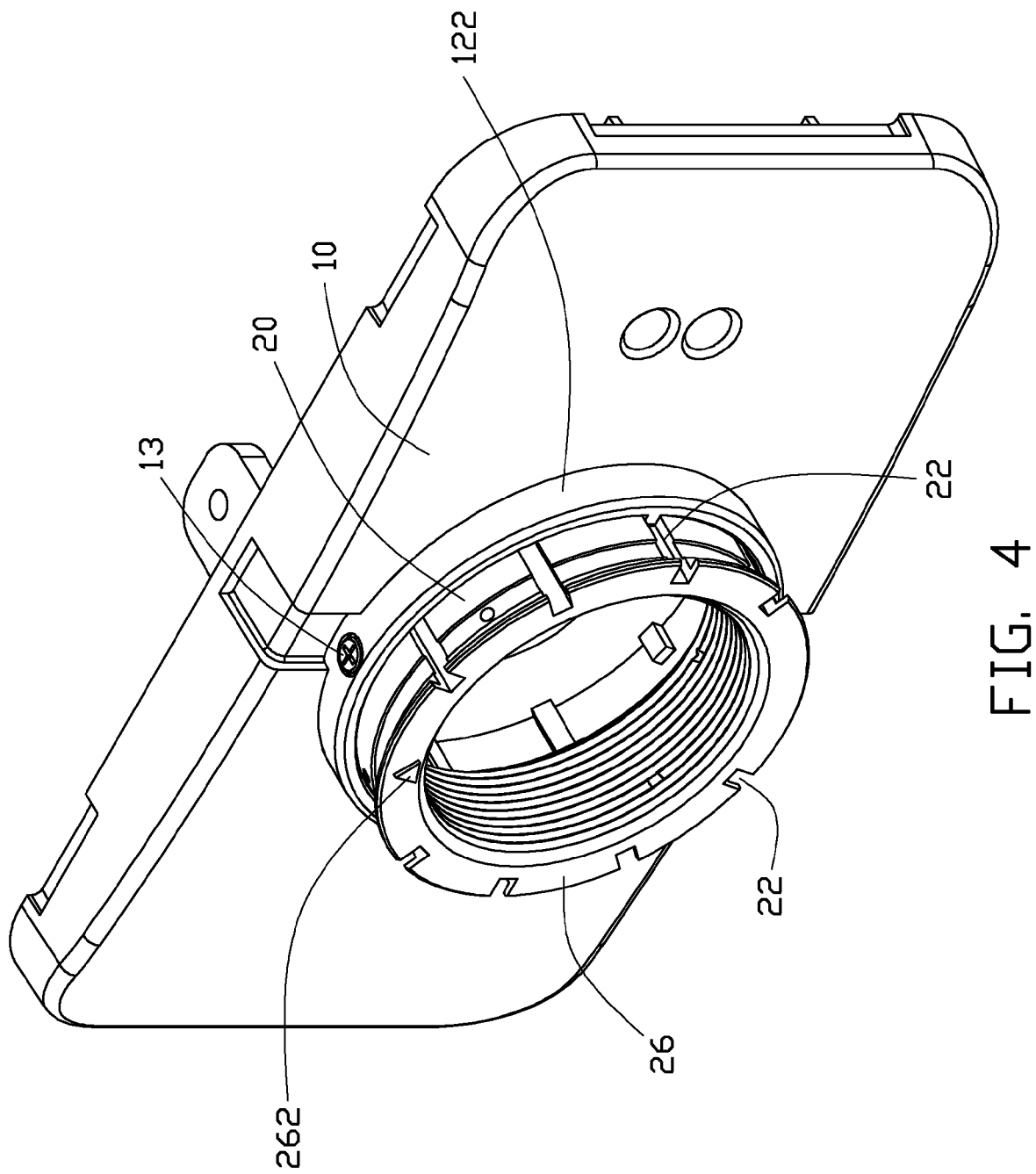
FIG. 4 is an assembled, isometric view of the digital camera of FIG. 1.
Figure 5:
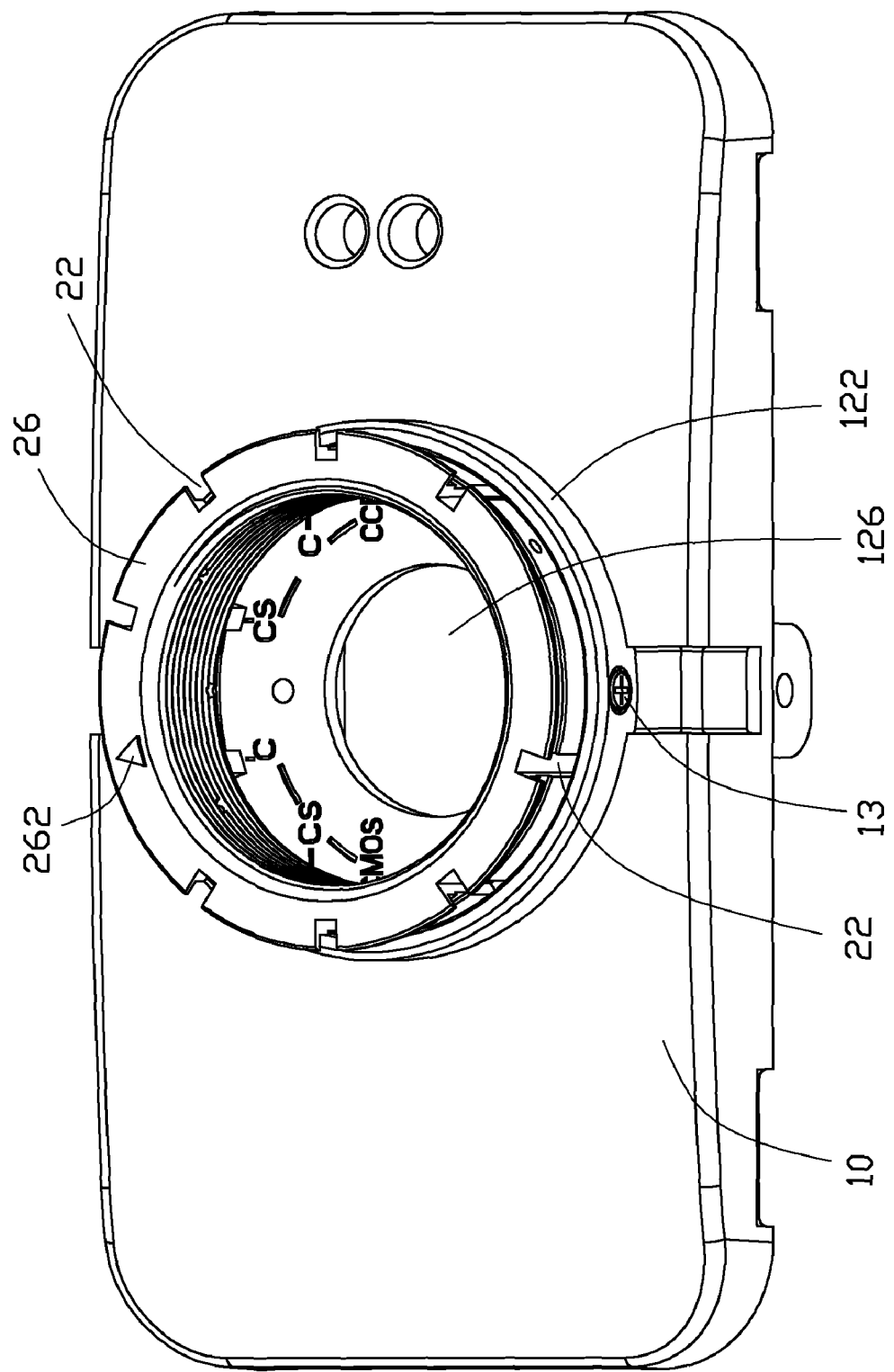
FIG. 5 is an assembled, isometric view of the digital camera of FIG. 1, but viewed from another aspect.

Referring to FIGS. 4-5, when the image sensor 32 is a CMOS image sensor and the lens is a C-mount lens, the symbol "▲" 262 is aligned with the symbol "C" and near the symbol "CMOS". Each bar-shaped slot 22 is arranged in one-to-one correspondence with a respective one of the support arms 141-145. The bar-shaped slots 22 are placed around the support arms 141-145, the symbol portion 24 rests on and abuts an end surface of the third support arm 143. The extending ring 20 is secured in the recess 12 by the fasteners 13 each passing through one through hole 1222 and engaging with one threaded hole 27 of the extending ring 20. Finally, the lens and the extending ring 20 can be secured to each other through the threaded hole 28 until the lens abuts the flange 26 of the extending ring 20, and a back focal length of the digital camera with the lens is mated.

When the image sensor 32 is a CMOS image sensor and the lens is a CS-mount lens, the symbol "▲" 262 is aligned with the symbol "CS" and near the symbol "CMOS". Each bar-shaped slot 22 is arranged in one-to-one correspondence with a respective one of the support arms 141-145. The bar-shaped slots 22 are placed around the support arms 141-145, and the symbol portion 24 rests on and abuts an end surface of the second support arm 142. The extending ring 20 is secured in the recess 12 by the fasteners 13 each passing through one through hole 1222 and engaging with one threaded hole 27 of the extending ring 20. Finally, the lens and the extending ring 20 can be secured to each other through the threaded hole 28 until the lens abuts the flange 26 of the extending ring 20, and a back focal length of the digital camera with the lens is mated.

When the image sensor 32 is a CCD image sensor and the lens is a C-mount lens, the symbol "▲" 262 is aligned with the symbol "C" and near the symbol "CCD". Each bar-shaped slot 22 is arranged in one-to-one correspondence with a respective one of the support arms 141-145. The bar-shaped slots 22 are placed around the support arms 141-145, and the symbol portion 24 rests on and abuts an end surface of the fifth support arm 145. The extending ring 20 is secured in the recess 12 by the fasteners 13 each passing through one through hole 1222 and engaging with one threaded hole 27 of the extending ring 20. Finally, the lens and the extending ring 20 can be secured to each other through the threaded hole 28 until the lens abuts the flange 26 of the extending ring 20, and a back focal length of the digital camera with the lens is mated.

When the image sensor 32 is a CCD image sensor and the lens is a CS-mount lens, the symbol "▲" 262 is aligned with the symbol "CS" and near the symbol "CCD". Each bar-shaped slot 22 is arranged in one-to-one correspondence with a respective one of the support arms 141-145. The bar-shaped slots 22 are placed around the support arms 141-145, and the symbol portion 24 rests on and abuts an end surface of the fourth support arm 144. The extending ring 20 is secured in the recess 12 by the fasteners 13 each passing through one through hole 1222 and engaging with one threaded hole 27 of the extending ring 20. Finally, the lens and the extending ring 20 can be secured to each other through the threaded hole 28 until the lens abuts the flange 26 of the extending ring 20, and a back focal length of the digital camera with the lens is mated.

While the invention has been described by way of example and in terms of embodiments, it is to be understood that the invention is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A digital camera, comprising:
a bezel defining a circular-shaped recess, N pairs of support arms being positioned on the inner sidewall of the recess, wherein each of the support arms substantially keeps a same distance from the adjacent support arms, the N is an integer equaling or exceeding 2; each of the pairs of support arms has different heights, and the two support arms in each of the pairs of support arms are symmetrically placed with respect to a central axis of the recess; and an extending ring defining N−1 pairs of bar-shaped slots in an outer sidewall thereof, wherein an end of the extending ring contacts an end surface of one of the N pairs of support arms, and the N−1 pairs of bar-shaped slots are covering the entire surface area of the other corresponding N−1 of the N pairs of support arms.

2. The digital camera of claim 1, wherein the outer diameter of the extending ring is less than the inner diameter of the recess, each of the support arms is bar-shaped and perpendicular to a bottom wall of the recess, and the width of each of the slots exceeds the width of each of the support arms.

3. The digital camera of claim 2, wherein an annular wall extends outwards from the bottom wall, and a pair of through holes is defined in the annular wall between two adjacent support arms; the extending ring further defines a plurality of pairs of threaded holes, each pair of threaded holes are positioned opposite to each other, one pair of threaded holes correspond to the through holes, and the extending ring is secured in the recess by fasteners, each passing through one through hole and engaging with one threaded hole.

4. The digital camera of claim 1, wherein the recess further comprises a plurality of symbols defined on the bottom wall, and the plurality of symbols comprises "CS", "C", "CMOS" and "CCD".

5. The digital camera of claim 1, wherein the N is 5 comprising a first pair of support arms, a second pair of support arms, a third pair of support arms, a fourth pair of support arms, and a fifth pair of support arms, the height of the first pair of support arms exceeds the height of the fifth pair of support arms, the height of the fifth pair of support arms exceeds the height of the third pair of support arms, the height of the third pair of support arms exceeds the height of the fourth pair of support arms, and the height of the fourth pair of support arms exceeds the height of the second pair of support arms.

6. The digital camera of claim 5, wherein the height of the first pair of support arms equals the depth of the recess, and the first pair of support arms is received in one pair of slots.

7. The digital camera of claim 5, wherein a difference in heights between the fourth pair of support arms and the second pair of support arms equals a difference in thicknesses between a CCD image sensor and a CMOS image sensor.

8. The digital camera of claim 2, wherein the end surface of one of the N pairs of support arms wedges the end of the extending ring when the other N−1 of the N pairs of support arms are engaged with the N−1 pairs of bar-shaped slots by being inserted into the N−1 pairs of bar-shaped slots.

9. The digital camera of claim 8, wherein the end surface is opposite to the bottom wall of the recess, such that the pairs of support arms support the extending ring when the end surface of the pairs of support arms wedges the end of the extending ring.

10. The digital camera of claim 1, wherein the end surface of the pairs of support arms is opposite to a bottom wall of the recess, such that the pairs of support arms support the extending ring when the end of the extending ring contacts the end surface of the pairs of support arms.

11. The digital camera of claim 1, wherein one of the N pairs of support arms is formed by a bottom wall of the recess, the other N−1 of the N pairs of support arms extend from the bottom wall.

* * * * *